H. V. SMITH.
REMOVABLE RAKE TOOTH.
APPLICATION FILED NOV. 9, 1908.
926,902.
Patented July 6, 1909.
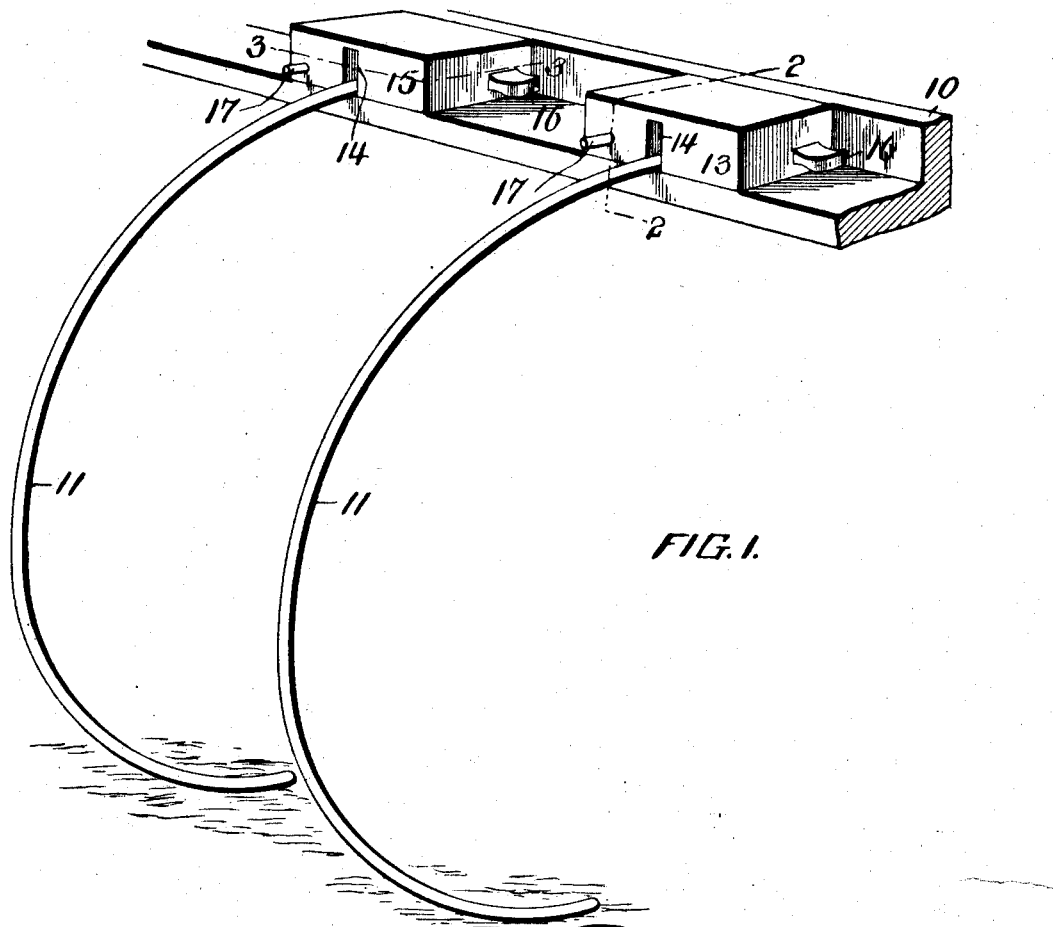
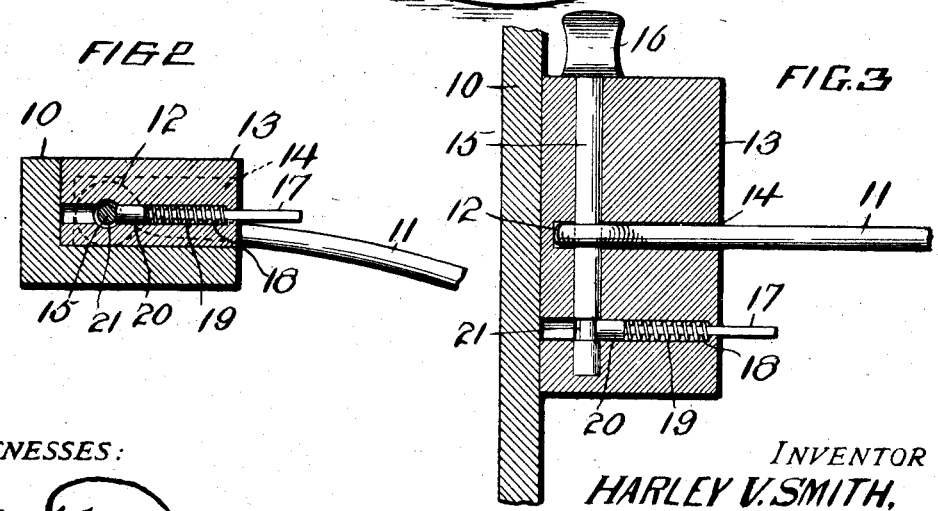
WITNESSES:
INVENTOR
HARLEY V. SMITH,
BY
Attorney

UNITED STATES PATENT OFFICE.

HARLEY V. SMITH, OF SYKESTON, NORTH DAKOTA.

REMOVABLE RAKE-TOOTH.

No. 926,902.   Specification of Letters Patent.   Patented July 6, 1909.

Application filed November 9, 1908. Serial No. 461,793.

*To all whom it may concern:*

Be it known that I, HARLEY V. SMITH, citizen of the United States, residing at Sykeston, county of Wells, and State of North Dakota, have invented certain new and useful Improvements in Removable Rake-Teeth, of which the following is a specification, reference being had therein to the accompanying drawing.

This invention relates to a removable rake tooth, and particularly to a structure adapted for horse rakes.

The invention has for an object to provide means by which each of the teeth may be removed from the rake head, and normally held therein by a spring held latch pin which can be withdrawn for the removal of a tooth.

Other and further objects and advantages of the invention will be hereinafter fully set forth and the novel features thereof defined by the appended claims.

In the drawing:—Figure 1 is a perspective view showing the application of the invention; Fig. 2 is a section on line 2—2, Fig. 1; Fig. 3 is a horizontal section on line 3—3, Fig. 1.

Like numerals refer to like parts in the several views of the drawing.

The numeral 10 designates the rake head which may be of any desired construction or configuration, and 11 the rake tooth thereof which may likewise be formed to the requirements of use. This tooth is provided with an eye or pivot 12 at one end, as shown in Fig. 2 and adapted to be disposed within the bearing block 13 which is provided with a vertically disposed slot 14 to permit the oscillation or vertical movement of the tooth contingent upon the conformation of the ground with which it contacts. This tooth is retained in position by a latch or pivot pin 15 having a head 16 and extended through a proper recess in the block 13 so as to intersect or traverse the opening 14 in which the rake tooth is introduced and pass through the eye 12 thereof so as to retain the tooth in operative position and permit the proper movement thereof. This pin is normally retained in position by means of the spring latch of any desired construction, for instance, a bolt 17 disposed in the recess 18 in the block and provided with the spring 19 which normally holds the head 20 of the bolt in contact with the circumferential recess or channel 21 upon the pin 15 and thereby prevents the accidental displacement or withdrawal of the pin and holds it in proper retaining position until positively released for the removal of the rake tooth when injured or replacement thereof is desired.

In the operation of the invention it will be seen that each tooth of the rake is individually held in position for removal or replacement without disturbing the remaining teeth by means of the bolt, and this bolt is positively locked and held by the latch until it is desired to remove the same so that the rake may be supplied with teeth of different characters as desired, or those therein which may be damaged readily replaced. It will also be observed that the pivot block permits a vertical oscillation of the tooth upon its pivoting eye so that it may conform to inequalities in the ground without offering resistance to the head or causing injury to the free end of the tooth which travels upon the ground to perform the raking function in the usual manner. It will therefore be seen that the invention presents a simple, efficient and economically constructed device to retain the rake teeth in position to accomplish the most efficient operation.

Having described my invention and set forth its merits, what I claim and desire to secure by Letters Patent is:—

1. The combination with a rake head provided with a pivoting block, of a tooth pivoted in said block, a pin forming a pivot for said tooth, and a spring pressed bolt disposed laterally of said pin to engage and retain it in position.

2. The combination with a rake head provided with a pivoting block, of a tooth pivoted in said block, a pin having a recess and forming a pivot for said tooth, and a spring pressed bolt engaging the recess in said pin to prevent its removal from said block.

3. The combination with a rake head provided with a pivoting block, of a tooth pivoted in said block, a pin having a recess and forming a pivot for said tooth, a spring pressed bolt engaging the recess in said pin to prevent its removal from said block, a head upon said pin, and a withdrawing extension upon said bolt by which it may be relieved from contact with said pin.

4. The combination with a rake head, of a tooth bearing thereon having a vertically disposed slot therein, a tooth having a pivoting eye disposed within said bearing, a pin provided with a circumferential groove and disposed in said bearing to pass through said
5 eye, and a spring pressed bolt disposed in said bearing to engage said groove and having an extended operating end for releasing said pin.

In testimony whereof I affix my signature in presence of two witnesses.

HARLEY V. SMITH.

Witnesses:
 LIZZIE HASSE,
 ELLA M. JOURMEL.